United States Patent [19]

Hunter

[11] 4,125,288
[45] Nov. 14, 1978

[54] RECLINING SEAT

[76] Inventor: George T. Hunter, Rte. 3, Box 250, Howe, Ind. 46764

[21] Appl. No.: 833,019

[22] Filed: Sep. 14, 1977

[51] Int. Cl.² ............................................. A47C 1/026
[52] U.S. Cl. ..................................... 297/369; 16/146; 16/180; 16/191; 297/306
[58] Field of Search ............... 297/369, 368, 365, 364, 297/366, 367, 355, 379, 306, 300; 16/139, 145, 146, 180, 181, 189, 191; 254/10.5; 403/120, 113, 112; 248/383

[56] References Cited

U.S. PATENT DOCUMENTS

| 514,830 | 2/1894 | Kern | 297/365 |
|---|---|---|---|
| 2,738,829 | 3/1956 | Rowe | 297/365 X |
| 2,997,341 | 8/1961 | Borgia | 297/369 |

FOREIGN PATENT DOCUMENTS

| 1,310,558 | 10/1962 | France | 297/365 |
|---|---|---|---|
| 474,198 | 9/1952 | Italy | 297/369 |

*Primary Examiner*—James T. McCall
*Assistant Examiner*—William E. Lyddane
*Attorney, Agent, or Firm*—Marmaduke A. Hobbs

[57] ABSTRACT

A reclining seat for a variety of different uses, but in particular for vehicles such as vans, motor homes, car seats and buses, in which a reclining back is pivoted to the rear portion of the seat section and a latch mechanism for retaining the back in a selected position consists of a striker plate attached to the back and a releasable lever mounted on the seat section for engagement with shoulders on the striker plate to hold the seat in selected positions. The back is urged forwardly by a spring, preferably a coil spring on each side between the seat section and the back, into engagement with a removable abutment on the seat section. The abutment can be removed and the back tilted forwardly sufficiently to relieve tension on the coil spring to facilitate replacement thereof. The latch mechanism is so constructed and arranged that the seat cannot easily be released while the weight of the occupant is resting on the back, thus avoiding unintentional or accidental releasing of the back by someone other than the occupant.

11 Claims, 8 Drawing Figures

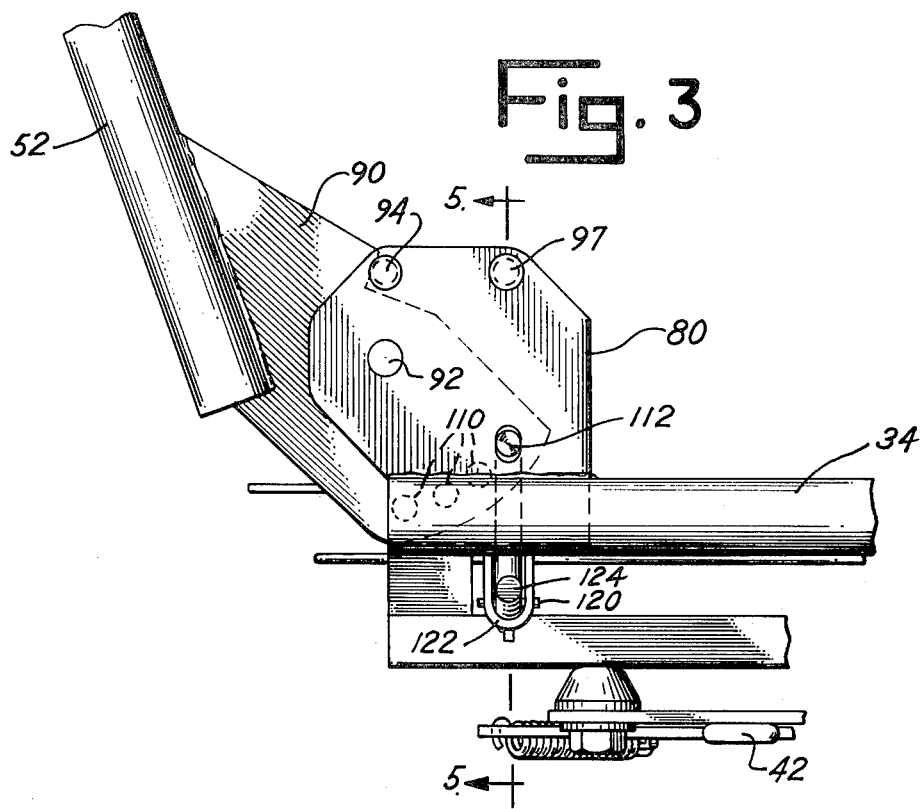
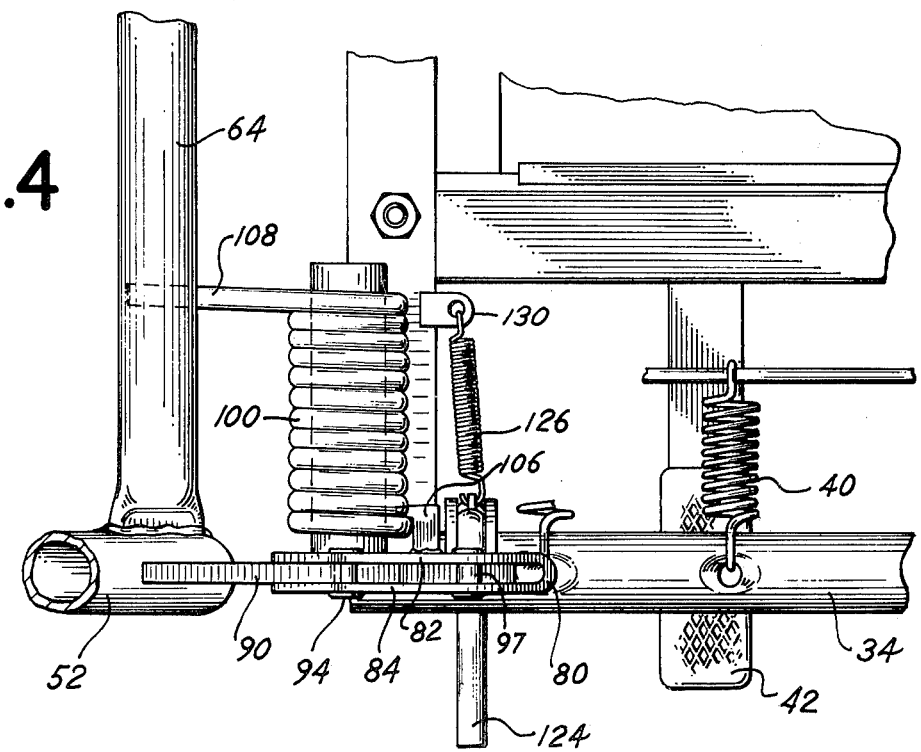

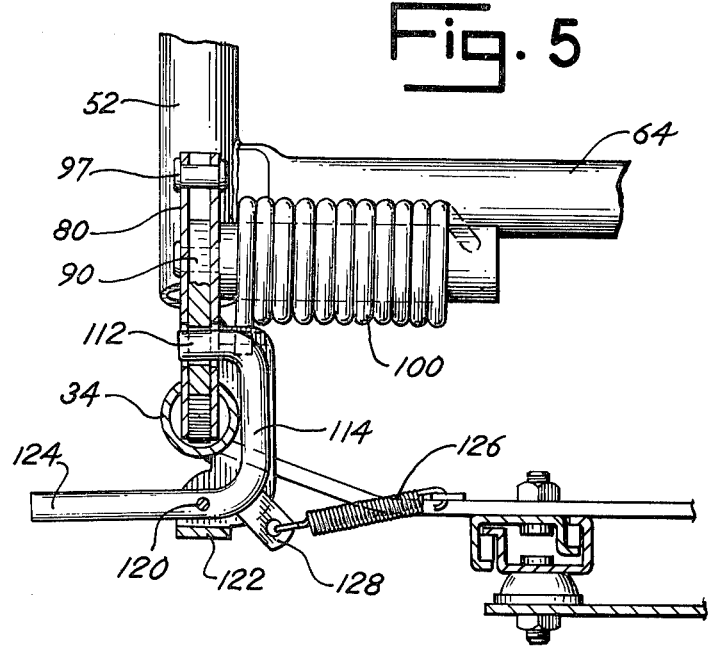
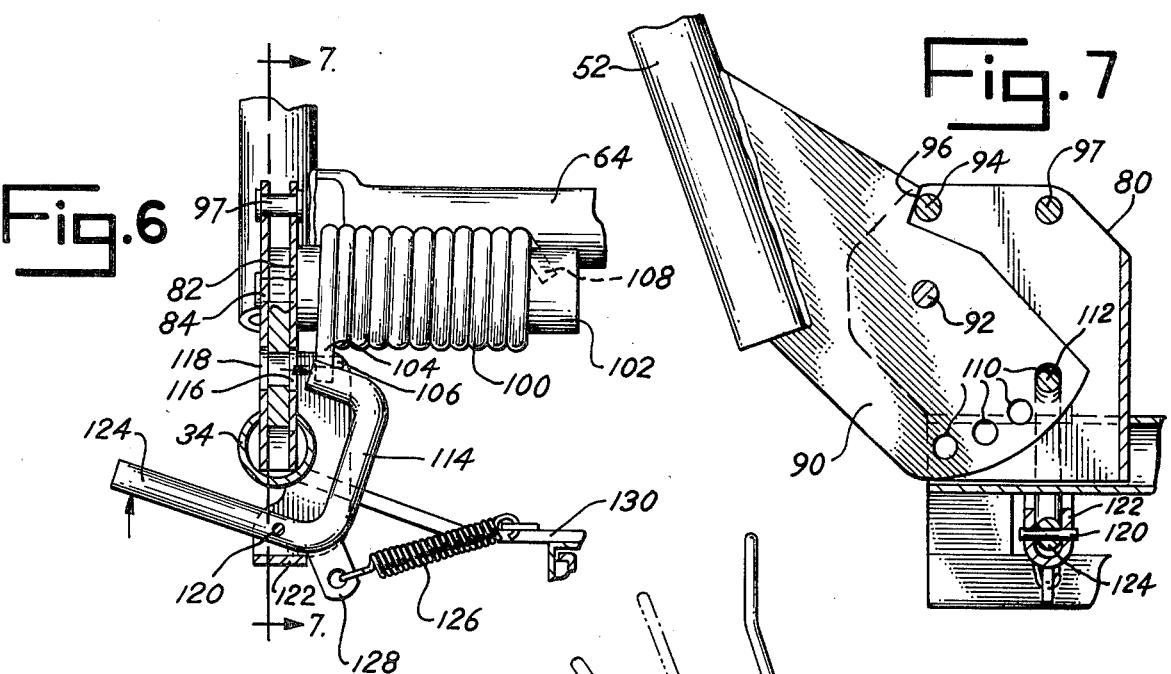
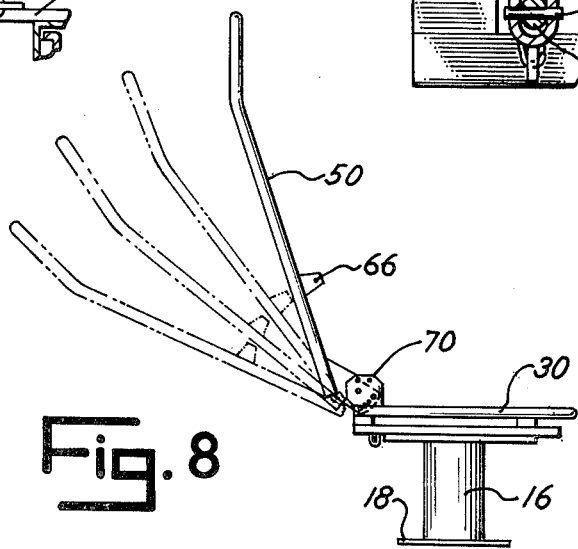

RECLINING SEAT

Passenger seats on commercial aircraft, interstate buses, and train coaches are usually of the reclining type and seats for aircraft and boat pilots, drivers of buses, vans, boats, motor homes and similar vehicles, are often adjustable in order to provide maximum comfort for the occupant. In these types of seats, the seat section is usually mounted on a pedestal or legs rigidly attached to the floor or other firm supporting structure and the back usually pivots rearwardly and forwardly relative to the seat portion. The back is often adjustable to several angular positions, from almost vertical position to a substantially reclining position. Most of these prior reclining seats were operated by a lever or push button on one of the arms or along or under one side of the seat section, which released a latch permitting the back to be pushed rearwardly by the occupant, and relatched when the lever or button was released. The seat adjustment mechanism was normally free to move as soon as the lever or button was operated, and, if the lever or button was unintentionally or accidentally operated, the seat back would immediately shift position one way or the other, depending upon the pressure being applied by the occupant. This sometimes resulted in an abrupt shifting of the back, for example rearwardly and downwardly, before the occupant was prepared to control the movement of the back. Further, another person without the permission of the occupant might accidentally or otherwise release the latch, thus permitting the back to shift abruptly and uncontrolled to the maximum rearward or forward position. This sometimes jarred or shook the occupant, possibly causing injury and pain to the occupant. It is therefore one of the principal objects of the present invention to provide a multiple position reclining seat in which the control mechanism for reclining the back cannot readily or easily be released without the consent and cooperation of the occupant, and which, when released, can easily be adjusted to any one of the available positions.

Another object of the invention is to provide a seat with a reclining, multiple position back which is difficult, if not impossible, to release for adjustment between positions while any substantial pressure is being applied by the occupant of the seat against the back, and which can easily be released when only slight pressure is being applied to the back.

Still another object of the invention is to provide a multiple position reclining seat in which the back can readily be placed in any one of the positions and reliably retained in a selected position until intentionally released by the occupant, and in which the seat portion and back are mounted on a support for movement forwardly and rearwardly independent of the reclining operation.

A further object is to provide a seat of the aforesaid type which is simple in construction and operation, and which can be readily repaired in the event the adjustment mechanism is broken or becomes unduly worn during service.

Additional objects and advantages of the present invention will become apparent from the following description and accompanying drawings, wherein:

FIG. 3 is an enlarged fragmentary elevational view of a portion of the operating mechanism for the seat shown in FIGS. 1 and 2;

FIG. 4 is a top plan view of a portion of the mechanism shown in FIG. 3;

FIG. 5 is a vertical cross sectional view of the mechanism shown in FIGS. 3 and 4, the section being taken on line 5 — 5 of FIG. 3 and showing the mechanism in one operating position;

FIG. 6 is a vertical cross sectional view, similar to that shown in FIG. 5, showing the mechanism in another operating position;

FIG. 7 is a vertical cross sectional view of the mechanism shown in FIGS. 4, 5 and 6, the section being taken on line 7 — 7 of FIG. 6; and FIG. 8 is a side elevational view of the frame of the seat showing the reclining back in various angular positions.

Figure 1:
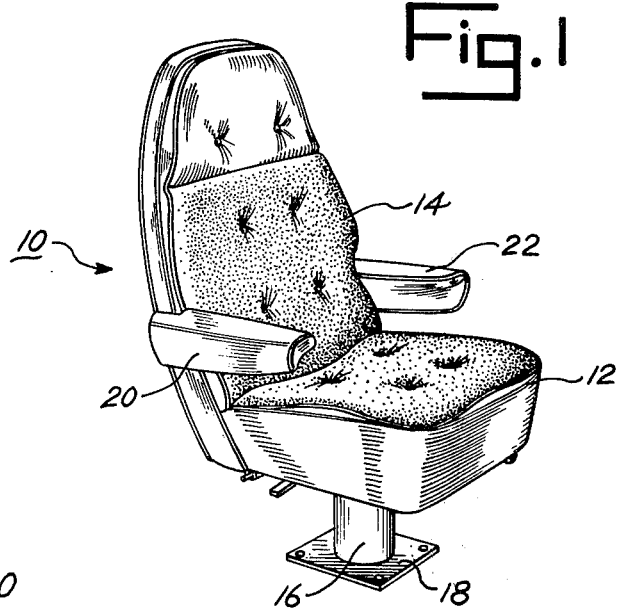
FIG. 1 is a perspective view of an upholstered seat embodying the present invention.
Figure 2:
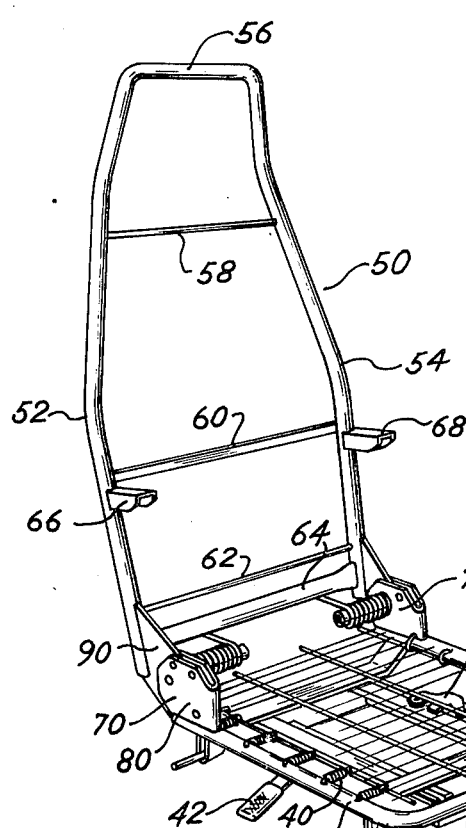
FIG. 2 is a perspective view of the frame of the seat, showing the structure embodying the present invention.

Referring more specifically to the drawings, numeral 10 indicates generally a completed seat embodying the present invention and having an upholstered seat section 12, an upholstered back section 14, and a pedestal 16 supporting the seat section and having a base 18 rigidly secured thereto and adapted to be bolted or otherwise firmly secured to the floor or other suitable structure of a vehicle, for example. The seat shown in the drawings is provided with arms 20 and 22 secured to the back section. Various kinds of upholstery and cushions may be used for both the seat and back sections and, in some instances, the arms may be adjustable angularly with respect to the back or omitted altogether. Since the present invention is concerned with the frame structure involving the reclining back feature, the details of the upholstery and external appearance will not be described in further detail.

The frame of the seat section consists of a generally U-shaped member 30 having side members 32 and 34 and a connecting member 36 at the forward edge of the seat section. A resilient structure for supporting the cushion in the seat section consists of a plurality of wires 38 extending between members 32 and 34 and having springs 40 at one end of the wires. The seat section is preferably adjustable on pedestal 16 and may be pivoted thereon by the operation of a lever 42 and slid forwardly and rearwardly by the operation of a lever 44. The support for the cushion and the adjustability of the seat section on the pedestal may be considered as conventional for the purpose of the present invention, even though these features would normally be included in the final seat structure.

The frame 50 of the back section consists generally of vertical side members 52 and 54 and cross member 56 at the top, and intermediate cross members 58, 60 and 62 and a lower cross member 64, each of said cross members being rigidly connected to the upright side members 52 and 54. The side members 52 and 54 are normally provided with some means such as lugs 66 and 68 for supporting arms 20 and 22. The frame of the back section is pivoted to the seat section by mechanisms 70 and 72 on the right and left sides of the seat. Mechanism 70 consists of a fixture 80 rigidly secured by welding or other suitable means to frame member 34 of the seat section and has inner and outer spaced side walls 82 and 84 joined to one another at the forward edge. The two side walls and forward edge are normally formed by a stamping operation using a single piece of metal. A plate-like fixture 90 is secured to the lower portion of upright member 52 of the back section and extends into the space between the two side walls 82 and 84, the fixture 90 being pivoted to fixture 80 by a pin 92 extending through the two side walls 82 and 84 and through a hole in fixture 90. The forward movement of the back on the pivot pin is determined by a pin 94 extending through holes in the two side walls 82 and 84 and forming a stop for a shoulder 96 on the upper surface of plate fixture 90.

The back is constantly urged forwardly by coil spring 100 mounted on a stub shaft 102 and having one end 104 engaging a lug 106 and the other end 108 engaging cross member 64. Stub shaft 102 is welded or otherwise rigidly joined to the external surface of wall 82. When the back has been assembled with fixture 90 inserted in fixture 80, the spring constantly urges the back forwardly. For convenience in replacing the spring, pin 94 can be removed and the back tilted forwardly sufficiently to relieve the tension on coil spring 100 so that it can be easily slipped off shaft 102. A new spring is mounted on shaft 102 and the back is then pivoted rearwardly until shoulder 96 passes the hole for pin 94 with the back in the rearward position, and pin 94 is inserted in the holes therefor in fixture 80. If desired, a forward limit pin 97 may be provided for the back section when it is tilted after being released by pin 94. Thus far in the description, mechanisms 70 and 72 are essentially identical and hence the parts of mechanism 72 will be identified by the same numerals plus a prime and those parts will not be described in further detail.

The mechanism 70 is adjusted as illustrated in the drawings to four positions as determined by a plurality of holes 110 in the lower edge of fixture 90. These holes are arranged on an arc having a radius on pivot pin 92 and are adapted to receive a pin-shaped finger 112 of operating lever 114. When the finger 112 is inserted through openings 116 and 118 in walls 82 and 84, fixture 90 is prevented from pivoting on pin 92, thereby holding the back section in an adjusted position. Operating lever 114 is pivoted on a pivot pin 120 seated in a bracket 122 and is provided with a handle 124 for withdrawing finger 112 from holes 110, 116 and 118 to release the back so that it can be adjusted. The lever 114 is urged in the direction to constantly seat finger 112 in the holes by a spring 126 connected to a lug 128 and to a bracket 130 secured to a member on the seat section. A similar adjustment device is not included in mechanism 72, since one will effectively retain the back in any one of the angularly adjusted positions. When the back is pivoted rearwardly, the ends of the spring engage the respective end 104 and engage lug 106, and end 108 engages cross member 64, thus applying a tension on the spring for constantly urging the back section forwardly.

In the operation of the present reclining seat as used in a vehicle, such as a bus or the driver's seat of a motor home, the back section is adjusted to the desired position while the seat is occupied, by the occupant's removing most of the body pressure from the back, thus permitting lever 114 to easily withdraw finger 112 from holes 110 in fixture 90. With the finger removed therefrom, the back can be pivoted to the desired position, and upon the release of lever 114, spring 126 returns finger 112 to the selected hole 110 for the desired angular position of the back section. Handle 124 can easily be reached by the occupant to perform the adjustment operation. With the adjustment device used in the mechanism 70, the lever cannot be easily operated to withdraw finger 112 from holes 110 while the pressure of the occupant's body is on the back, and hence is not likely to be accidentally or unintentionally operated by someone else to release the back.

While only one embodiment of the present reclining seat has been described in detail herein, various changes and modifications may be made without departing from the scope of the invention.

I claim:

1. A reclining seat comprising a seat section, a back section disposed along the rear edge of said seat section, pivot means connecting said back section to said seat section for reclining said back section relative to said seat section, spring means for urging said back section forwardly on said pivot means, and a latch mechanism on one side of said seat and back sections for retaining said back section in one of several positions, said mechanism including a fixture attached to said back section near said pivot means and movable forwardly and rearwardly as said back section pivots forwardly and rearwardly and containing a plurality of openings with the edges thereof forming shoulders spaced in the forward and rearward direction, and means on said seat section including a finger along the side of said seat section and said fixture for engaging said shoulders to retain said back section in a selected position, means connecting said finger to said seat section for releasably retaining said finger in latching position with said shoulders on said fixture, means for releasing said finger from said shoulders when an adjustment in the angular position of said back section is to be made, and a releasable means operatively interconnecting said fixture and the means on said seat section for determining the forward extent of the angular movement of said back section and, when released, said releasable means permitting said back section to pivot forwardly to a position where the tension on said spring is reduced substantially to zero.

2. A reclining seat as defined in claim 1 in which said pivot means connecting said back section to said seat section operatively interconnects said fixture and said means on said seat section in pivotal relationship.

3. A reclining seat as defined in claim 1 in which said fixture attached to said back section consists of a plate-like member extending generally forwardly and rearwardly with respect to said back and seat sections, and said openings are holes therethrough.

4. A reclining seat as defined in claim 1 in which said means on said seat section includes a plate-like member having a hole therethrough for receiving said finger and holding said finger against translatory movement.

5. A reclining seat as defined in claim 3 in which said means on said seat section includes a plate-like member having a hole therethrough for receiving said finger and holding said finger against translatory movement.

6. A reclining seat as defined in claim 3 in which said means on said seat section includes two spaced upright plate-like members, having holes in axial alignment and adapted to align with the holes in said plate-like fixture for receiving said finger to hold said fixture and means on said seat section in selected adjusted positions.

7. A reclining seat as defined in claim 1 in which said finger and said means for releasing said finger consist of a single continuous piece, and a bracket on said seat section supports said piece for pivotal movement on an axis transverse to the axis of said pivot means for withdrawing and inserting said finger in said openings.

8. A reclining seat as defined in claim 6 in which said finger and said means for releasing said finger consist of a single continuous piece, and a bracket on said seat section supports said member piece for pivotal movement on an axis transverse to the axis of said pivot means for withdrawing and inserting said finger in said holes.

9. A reclining seat as defined in claim 1 in which said spring means for urging said back section forwardly is mounted on a stub shaft and a lug is provided on the seat section for engagement with one end of said spring.

10. A reclining seat as defined in claim 8 in which said spring means for urging said back section forwardly is mounted on a stub shaft and a lug is provided on the seat section for engagement with one end of said spring.

11. A reclining seat as defined in claim 10 in which a mechanism is provided on the side of said seat and back sections opposite said first mentioned mechanism, consisting of a plate-like fixture on said back section near the lower portion thereof, a means on the seat section having two plate-like walls, and a pivot means extends through said plate and plate-like means to form a part of said pivot means.

* * * * *